United States Patent [19]

Forslind

[11] Patent Number: 5,507,608
[45] Date of Patent: Apr. 16, 1996

[54] PILOTED HAND TOOL ADAPTOR

[76] Inventor: Stephen R. Forslind, 5 Burnett St., Nashua, N.H. 03060-4931

[21] Appl. No.: 308,573

[22] Filed: Sep. 19, 1994

[51] Int. Cl.⁶ .................................................. B23G 5/00
[52] U.S. Cl. ...................... 408/239 A; 82/110; 408/222; 470/198; 470/207
[58] Field of Search .................... 470/198, 207; 408/121, 215, 221, 222, 239 A, 240, 241 R; 82/110

[56] References Cited

U.S. PATENT DOCUMENTS

| | | | |
|---|---|---|---|
| 2,383,991 | 9/1945 | Sarossy | 82/110 |
| 2,465,541 | 3/1949 | Kreshock | 408/215 |
| 2,607,055 | 8/1952 | Starkel | 408/222 |
| 2,680,257 | 6/1954 | Haugeland | 470/198 |
| 3,189,923 | 6/1965 | Smyth | 408/221 |
| 3,364,510 | 1/1968 | Johnson | 10/150 |
| 3,653,780 | 4/1972 | Ammatuna | 408/241 R |
| 4,081,873 | 4/1978 | Lemanski | 470/198 |
| 4,087,195 | 5/1978 | Wood | 408/240 |
| 4,097,182 | 6/1978 | Rolnick | 470/207 |
| 4,687,384 | 8/1987 | McCoy | 408/16 |
| 4,856,946 | 8/1989 | Park | 408/122 |
| 4,988,243 | 1/1991 | Proffitt | 408/241 R |
| 5,343,787 | 9/1994 | McDonnell | 470/207 |

*Primary Examiner*—Daniel W. Howell
*Attorney, Agent, or Firm*—Vernon C. Maine

[57] ABSTRACT

A piloted hand tool adaptor for connecting a conventional rotary hand tool or rotary cutting tool to the chuck of a rotary-operated machine such as a lathe or drill press in order to provide mechanical axial support and alignment of the tool to a work piece while allowing manual rotation and advancement of the tool towards the work piece. One end of the adaptor has means such as a socket to attach to the butt-end and T-bar handle of a rotary hand tool such as a common tap handle. The other end of the adaptor has a two element axial support system such as a pilot and bushing, grippable within the chuck of the rotary-operated machine, which provides axial or lateral support and alignment without affecting manual control of rotational and longitudinal motion. The adaptor may have a supplemental detachable handle bar oriented perpendicular to the T-bar handle of the hand tool.

11 Claims, 5 Drawing Sheets

5,507,608

PILOTED HAND TOOL ADAPTOR

BACKGROUND OF INVENTION

1. Field of Invention

This invention relates generally to use of hand tools for conducting rotary operations, particularly to the use of such hand tools where axial alignment of the tool to the intended target is important to the success or the quality of the operation.

More particularly, this invention relates to the manually conducted rotary cutting of threads in work pieces to provide a mating component to threaded fasteners such as bolts, and for other extended purposes where such features are useful.

Even more particularly, this invention relates to use of such hand tools in a machine shop environment where work pieces may be subjected to other operations requiring rotary-operated machinery such as drill presses and lathes.

Most particularly, this invention relates to means of adapting such hand tools to use mechanical support to aid in maintaining axial alignment of the hand tool to the intended target during thread-cutting or other rotary operations on a work piece secured in a lathe or drill press or other rotary machine, without detracting from the benefits of manual control of rotational and longitudinal force and motion during such operations.

2. Description of Prior Art

Often a machinist is called upon to tap a drilled hole in a work piece already secured in, for example, a lathe. It is essential that the tap be held in careful, close axial alignment with the center line of the hole in the work piece, to prevent breakage of the tap, possible injury to the machinist, irreparable damage to the work piece, and to provide strong, true threads which will readily accept and secure a mating member.

A hand-held tapping operation as has normally been practiced is time consuming in the setting up of the work piece for drilling, and then removing the work piece to another position where it must again be set up for tapping, and perhaps then returned to the original station for further operations. Furthermore, the hand-held tapping operation does not ensure a perfectly aligned tap in relation to the work piece, so that the use of the hand held tap requires a skilled and experienced operator to properly perform the tapping operation. Manual tapping does, however, offer the important benefit of manual dexterity and sensitivity to varying longitudinal and rotational resistance inherent with different tap sizes and different materials.

The solution to the axial alignment problem of simple, unaided, hand tapping of threads is to employ mechanical means for axial support. Fully automated machinery is available for high volume work which includes tapping operations, but such machines are expensive and generally entail significant set up time.

For custom, low volume and pre-production applications, there are three generally accepted ways for employing mechanical means to aid in the manual tapping process: 1.) Insert the proper tap into the tail stock drill chuck of a lathe and turn the head stock and work piece by hand onto the tap, 2.) Follow the tap and tap handle into the work piece with the tail stock live or dead center, or 3.) Center a pulley tap in the center-rest while turning the tap by hand with a thin open-faced tap handle.

Similar tapping methods are used with other rotary-operated machines such as a drill press or milling machine.

None of these methods are particularly easy, and all require accessory devices and are time-consuming and troublesome.

Efforts to shorten tapping time and eliminate misalignment and tap breakage have resulted in relatively complicated and expensive accessory tools, special tap holding chucks and turning wheels engaging the chucks, and special tap holders. The following patents are illustrative of the prior art:

Proffitt U.S. Pat. No. 4,988,243, Jan. 29, 1991: A chuck-mounted, spring loaded, centering tip that can be latched in a retracted position and released to engage and push on the butt end of a conventional tap handle and tap. This is a relatively complicated and costly accessory that may subject the tap, workpiece, and initial threads to excessive longitudinal pressure in order to maintain the axial alignment and mechanical integrity of the setup. It has a long axial length which means the chuck mount may have to be moved well back for installation. The device does not provide any supplemental turning means to assist the operator in rotating the tap handle.

Park U.S. Pat. No. 4,856,946, Aug. 15, 1989: Uses a rachet for torque, has its own tap chuck to hold the tap, and uses a chuck-mounted "press member" with external pressure to maintain a longitudinal force through the centering guide of the rachet assembly to keep the assembly axially aligned while in use. A relatively complicated and costly accessory with a long axial length; the method requires the application of longitudinal pressure which may be excessive for many tap sizes and work piece materials, in order to maintain axial alignment and mechanical integrity of the setup. Also, it is not readily adaptable to be used with conventional hand-held tapping tools.

McCoy U.S. Pat. No. 4,687,384, Aug. 18, 1987: A hand-held tapping tool incorporating a spring-loaded slider and graduated scale between the handle and the tap chuck. The device is intended to be back-stopped by a chuck-mounted tip under pressure from the spring in the tap handle. The progress of the tap into the work can be measured by use of the scale on the tap handle. A relatively complicated and costly accessory, it is likewise dependent on exerting a longitudinal force on the chuck-mounted tip sufficient to maintain the axial alignment and mechanical integrity of the setup, without regard to the potentially detrimental effect of excessive longitudinal force on the tap, work piece and initial threads.

Wood U.S. Pat. No. 4,087,195, May 2, 1978: Similar to a conventional manual tap handle, but modified to fit into the chuck of a rotary-operated machine. The device has an axially slidable, rotatable support means on the butt end which can be chucked to provide axial support without longitudinal pressure. Unnecessarily duplicative of features of a conventional hand tap handle.

Johnson U.S. Pat. No. 3,364,510, Jan. 23, 1968: A slidable, rotatable, chuck-mounted tapping tool with a keyed tap chuck and an external collar and rachet handle that fits over external splines to provide turning torque. A relatively complicated and costly accessory.

None of these devices combine the full utility of the conventional tap handle which is a basic item in the tool box of every machinist, with a minimal accessory adaptor which provides mechanical axial support without introducing unnecessary longitudinal force and without impeding the natural feel of the hand tap operation.

SUMMARY OF THE INVENTION

The main purpose of this invention is to provide a means of mechanical axial support and alignment for improved accuracy and efficiency of rotary hand tools, without detracting from the operator's or machinist's manual control of the rotational and longitudinal force and motion which are likewise necessary to safe, efficient, precise machining operations.

The invention in it's simplest form is a piloted hand tool adaptor that connects a hand-held rotary tool in a rotatable and slidable fashion to the chuck of a rotary-operated machine.

An object of the invention is to provide means for detachably attaching and securing a rotatable hand tool to an adaptor in a non-rotatable fashion by any commonly known means to include lock screws, clamps, latches, adhesives, and screw-on methods. One method would be an axial bore which is cast or machined for a friction fit or slip fit over the butt end of a conventional tap handle of the sort that most machinists already have in their tool chest, the axial bore being further configured with opposing slots in the side walls that engage the T-bar handle of the tap handle in a non-rotatable way.

Another object of the invention is to provide any known axial support and alignment means to the adaptor and attached hand tool that can be chucked or is grippable by the chuck of a rotary-operated machine upon which the piece under work can be clamped or otherwise secured. The support means must provide the needed axial support and alignment without impeding the manual rotation and advancement of the hand tool necessary to accomplish the work.

One such support means could be two or more guide elements arranged to be telescopically and rotatively related, the first element attached to the adaptor, the second element grippable by the chuck, such that the adaptor can be freely rotated and telescoped or slid longitudinally in and out of the chucked element, while still providing the lateral or axial support that insures precise axial alignment of the hand tool to the work piece.

The elements may be a pilot and corresponding grippable bushing, or a socket and corresponding grippable shaft, or other interoperable guide elements providing the same result.

Yet another object of the invention is to provide additional or supplemental means of manual rotation and control of the hand tool in the proposed setup required by the invention. To that end the adaptor may be configured with any known means for manually turning the adaptor, which due to it's non-rotatable connection to the hand tool and its rotatable connection to the supporting chuck, will impart a rotating force and motion to the hand tool without disturbing the axial alignment provided by the supporting chuck.

To that end, the adaptor may incorporate or accept any of several turning means including wrenches, rachet handles, right-angle gear and crank mechanisms. One specific turning means is a transverse bore in the adaptor body oriented perpendicular to the handle of the attached hand tool if there is one, with a bar that can be inserted to its midpoint and secured in the bore by a setscrew or other means. Alternatively, the bar may be unsecured and used for turning leverage in a sliding fashion if clearance limitations in some areas around the adaptor inhibit full rotation with the handle bar protruding in that direction.

Yet still another object of the invention is to provide an adaptor specifically designed to accept or connect to the most common tap handles likely to be possessed by machinists, to help provide and extract the maximum utility and flexibility from his or her existing thread-cutting tools. It is likewise a related object to provide an adaptor specifically designed to accept or connect to the most commonly used thread-cutting die tools.

A further object of the invention is to provide the benefit of the invention for varying sizes and configurations of hand tools. To that end the adaptor may be configured and produced in a variety of shapes and sizes to accommodate the broadest range of rotary hand tools and other rotary cutting tools, and rotary-operated machinery.

Other objects and advantages will appear in the description and in the drawings.

DESCRIPTION OF PREFERRED EMBODIMENT

Figure 1:
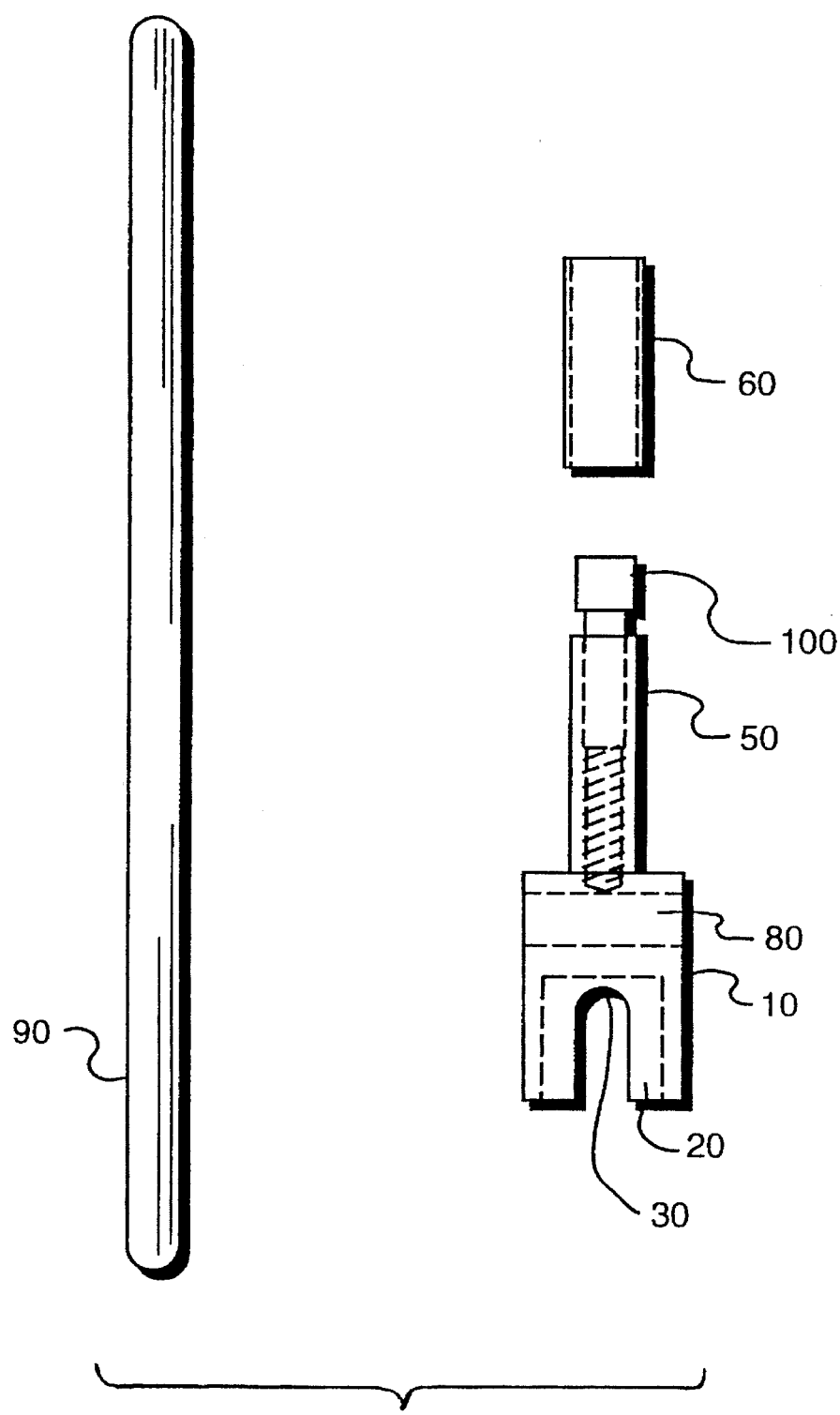
FIG. 1 is a front view of the three major components of a preferred embodiment of the piloted hand tool adaptor.

The invention may be generally described as a piloted hand tool adaptor for connecting various rotatable hand tools to the chuck of a rotary-operated machine in order to provide mechanical axial support and alignment of the hand tool to the work, without inhibiting the operator's manual control of advancing, retarding and rotating the hand tool as the work proceeds. To those skilled in the art, however, the invention admits of many variations.

As an example, one end of the adaptor may be configured to detachably attach and secure the hand tool by any commonly known means including but not limited to a slotted axial bore casted or machined for a friction fit or a slip fit over the butt end and T-bar of a tap handle or other rotary hand tool. Other and additional connecting means may include lock screws, clamps, latches, adhesives, a threaded connection or other known methods.

As another example, the other end of the adaptor may be configured with any known support means that is grippable by the chuck of a rotary-operated machine while providing for the adaptor and hand tool to be advanced, retracted, and rotated manually, relative to the work piece and the supporting chuck.

As yet another example, there may be two or more guide elements to the support means. There may be a first guide element located and axially oriented at the support end of the adaptor, with a second guide element telescopically and rotatively related and operatively mounted to the first guide, the second guide element being grippable by the supporting chuck.

As yet still another example, in the case of a two element support means, the elements may be a pilot appendage on the support end of the adaptor and a corresponding bushing that may be gripped or secured in the chuck, or conversely a socket on the support end of the adaptor and a corresponding shaft that may be gripped or secured in the chuck.

As an additional example, the adaptor may have a means or a supplemental means such as a detachable handle and transverse bore in the body of the adaptor for manually rotating the body of the adaptor along with the attached hand tool. The bore and adaptor handle may be oriented perpendicular to the T-bar handle to provide flexibility to the machinist or operator in manipulation of the hand tool. There may be a set screw to secure the handle at it's midpoint within the transverse bore, or the handle may be used in a sliding fashion to accommodate any clearance limitations to full rotation of the handle. Other possible turning means include wrenches, rachet handles, beveled gears and right-angle cranks.

As another additional example, the invention may be supplied in a variety of sizes and configurations to fit different classes and categories of hand tools.

As will be described in more detail, it is contemplated by the present invention to construct a piloted hand tool adaptor, one end of which will hold or be attachable to a conventional rotary hand tool, the other end of which will fit into the chuck of a rotary-operated machine to provide mechanical axial support and alignment of the hand tool to the work, analogous in part to the improvement of using a drill press versus a hand drill in a drilling operation.

Reference is now made to FIGS. 1–5, which illustrate pictorially the various elements of the preferred embodiments of the invention and dotted line representations of associated items that are not part of the invention.

One end of body 10 contains axial bore 20 and opposing side slots 30 sized to slip fit over the butt end and T-bar handle 41 of associated tap handle 40. At the other end of body 10 is pilot 50 and corresponding bushing 60 which is grippable in associated chuck 70.

Figure 2:
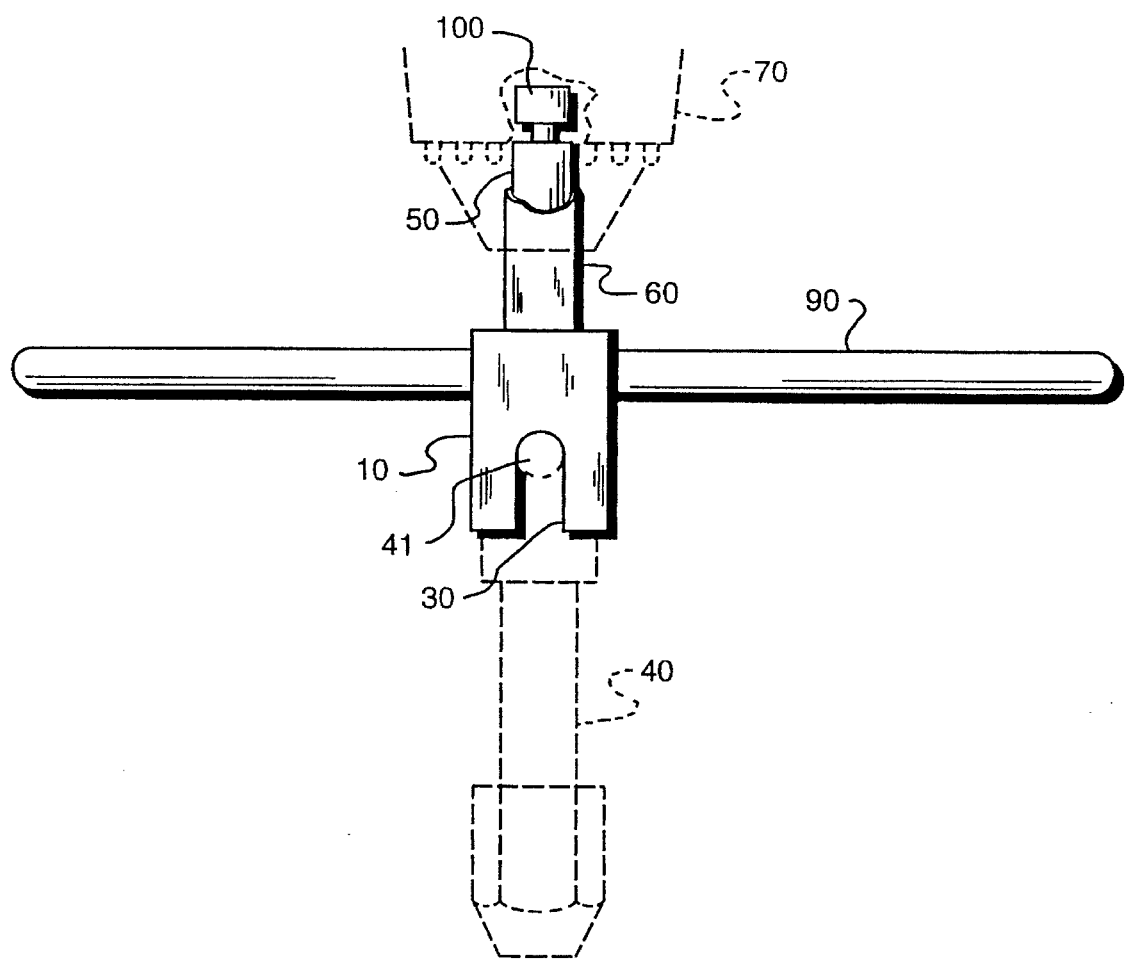
FIG. 2 is a front view of the components of FIG. 1 assembled and connected for use to associated items not part of the invention. (Associated items illustrated by dotted lines.)
Figure 3:
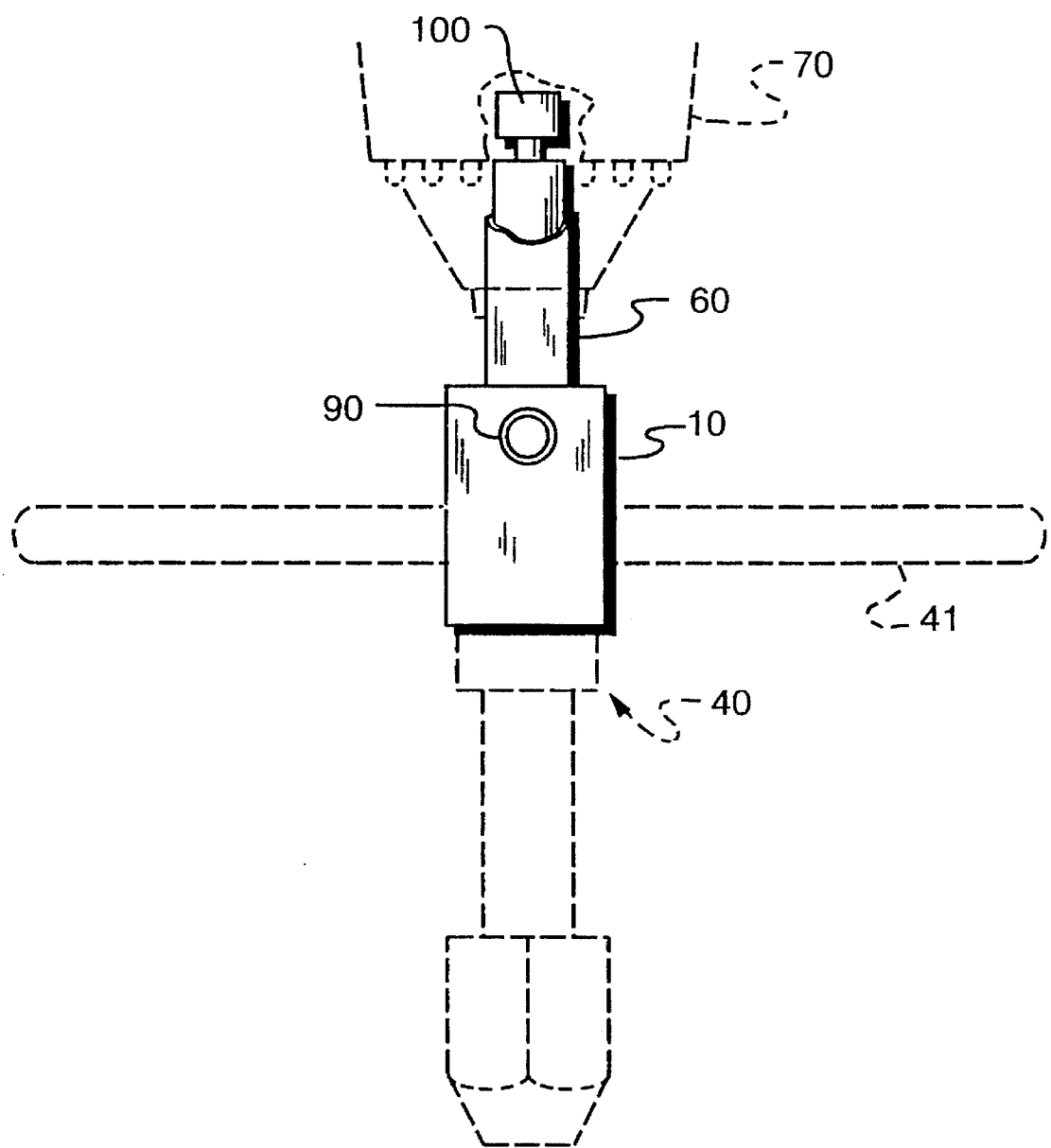
FIG. 3 is a side view of the components of FIG. 1 assembled and connected for use to associated items not part of the invention. (Associated items illustrated by dotted lines.)

FIGS. 1, 2, and 3 further illustrate transverse bore 80 in body 10, oriented perpendicular to opposing side slots 30 and the T-bar handle of associated tap handle 40. Handle bar 90 may be inserted halfway through transverse bore 80, secured by setscrew 100, and used to manually rotate body 10 and associated tap handle 40. Alternatively, handle bar 90 may be used in a sliding fashion to manually rotate body 10 and associated tap handle 40, where limitations on surrounding clearance inhibit full rotation with handle bar 90 secured at its midpoint.

Figure 4:
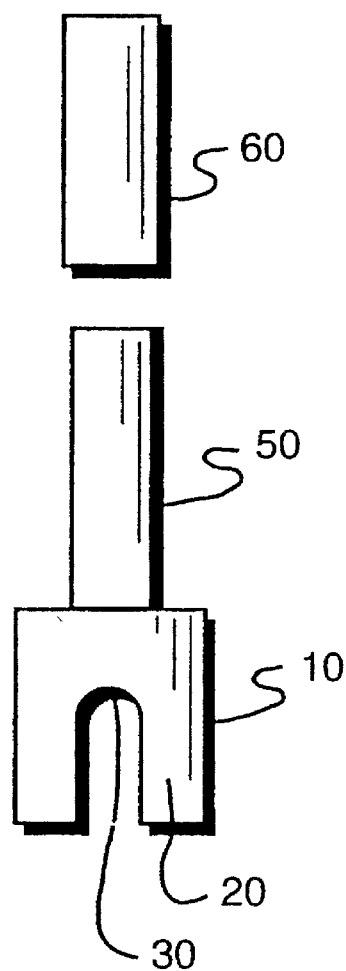
FIG. 4 is a front view of a minimal embodiment of the invention illustrating a pilot and bushing as the grippable support means.
Figure 5:
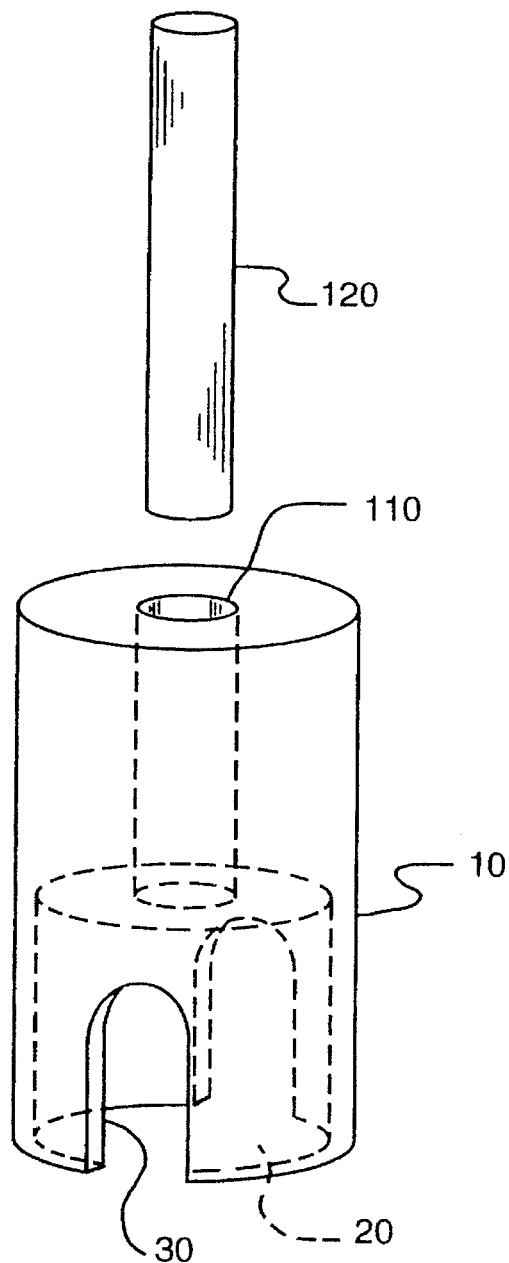
FIG. 5 is front perspective view of an alternate minimal embodiment of the invention illustrating a socket and shaft as the grippable support means.

FIGS. 4 and 5 illustrate minimal embodiments of the invention. FIG. 5 is contrasted to FIG. 4 by having socket 110 in lieu of pilot 50, and corresponding shaft 120 in lieu of corresponding bushing 60, as a support means grippable in associated chuck 70.

In operation, the subject work piece is secured in the head stock of a lathe or on the platform of a drill press, with the subject hole aligned on the operating axis of the machine for the preceding drilling operation. After removing the drill bit from associated chuck 70, bushing 60 or shaft 120 is inserted and gripped in the usual fashion. Chuck 70 need be tightened no more than hand tight to provide adequate axial support to the tapping operation. Body 10 with pilot 50 or socket 110 is fully mated to corresponding bushing 60 or shaft 120. Associated tap handle 40 is equipped with the proper size tap and then slip-fitted into axial bore 20 and opposing side slots 30. Chuck 70 is advanced until the tap tip contacts the work. Associated tap handle 40 is then operated in the normal fashion, being manually rotated and advanced into the work while chuck 70 provides mechanical axial support and alignment.

In other variations of the preferred embodiment, die tools or other hand-held rotary tools would be used in place of associated tap handle 40 in generally the same manner.

Although the drawings and the specification present a detailed disclosure of preferred embodiments of the present invention, it is to be understood that the invention is not limited to the specific form disclosed, but covers all modifications, changes and alternative constructions falling within the scope of the claims in light of this disclosure.

I claim:

1. A piloted hand tool adaptor for use with a rotatable hand tool and a chuck of a rotary-operated machine, comprising a body, one end of said body configured with connecting means for detachably attaching said hand tool, the other end of said body configured with support means grippable by said chuck.

2. The piloted hand tool adaptor of claim 1, said hand tool being a tap handle having a butt end with a T-bar, said connecting means being said one end of said body formed to slip-fit over said butt end and said T-bar of said tap handle.

3. The piloted hand tool adaptor of claim 2, said support means comprising a first guide element axially oriented and located at said other end of said body and a second guide element telescopically and rotatively related and operatively mounted to said first guide, said second guide element configured to be gripped in said chuck.

4. The piloted hand tool adaptor of claim 3, said first guide element being a pilot, said second guide element being a bushing, said bushing being sized to rotatably and slidably fit over said pilot.

5. The piloted hand tool adaptor of claim 3, said first guide element being a socket open to said other end, said second element being a shaft, said shaft being sized to rotatably and slidably fit within said socket.

6. The piloted hand tool adaptor of claim 4, further comprising a turning means for manually rotating said body, said turning means comprising a handle bar, said body having at least one transverse bore, said transverse bore sized to accept ready insertion of said handle bar and oriented perpendicular to said T-bar of said tap handle.

7. The piloted hand tool adaptor of claim 5, further comprising a turning means for manually rotating said body, said turning means comprising a handle bar, said body having at least one transverse bore, said transverse bore sized to accept ready insertion of said handle bar and oriented perpendicular-to said T-bar of said tap handle.

8. The piloted hand tool adaptor of claim 1, further comprising:

a turning means for manually rotating said body, said turning means comprising a handle bar, said body having at least one transverse bore, said transverse bore sized to accept ready insertion of said handle bar and oriented perpendicular to said T-bar of said tap handle;

said support means comprising a first guide element axially oriented and located at said other end of said body and a second guide element telescopically and rotatively related and operatively mounted to said first guide, said second guide element configured to be gripped in said chuck.

9. A piloted hand tool adaptor for use with a chuck of a rotary-operated machine and a tap handle having a butt end with a T-bar, comprising:

a body, one end of said body configured with connecting means for detachably attaching said tap handle, the other end of said body configured with support means grippable by said chuck;

a turning means for manually rotating said body, said turning means comprising a handle bar, said body having at least one transverse bore, said transverse bore sized to accept ready insertion of said handle bar and oriented perpendicular to said T-bar of said tap handle;

said hand tool being a tap handle and tap;

said connecting means being said one end of said body formed to slip-fit over said butt end and said T-bar of said tap handle; and said support means comprising a first guide element axially oriented and located at said other end of said body and a second guide element telescopically and rotatively related and operatively mounted to said first guide, said second guide element configured to be gripped in said chuck.

10. The piloted hand tool adaptor of claim 9, said first guide element being a pilot, said second guide element being a bushing, said bushing being sized to rotatably and slidably fit over said pilot.

11. The piloted hand tool adaptor of claim 9, said first guide element being a socket open to said other end, said second element being a shaft, said shaft being sized to rotatably and slidably fit within said socket.

* * * * *